US010974177B2

(12) United States Patent
Middler

(10) Patent No.: US 10,974,177 B2
(45) Date of Patent: Apr. 13, 2021

(54) FILTERING DEVICE AND CLEANING UNIT FOR REMOVING DIRT PARTICLES FROM A FILTER ELEMENT OF A FILTERING DEVICE

(71) Applicant: NORDSON CORPORATION, Westlake, OH (US)

(72) Inventor: Robert Middler, Havixbeck (DE)

(73) Assignee: Nordson Corporation, Westlake, OH (US)

(*) Notice: Subject to any disclaimer, the term of this patent is extended or adjusted under 35 U.S.C. 154(b) by 493 days.

(21) Appl. No.: 15/632,363

(22) Filed: Jun. 25, 2017

(65) Prior Publication Data

US 2018/0008911 A1    Jan. 11, 2018

(30) Foreign Application Priority Data

Jul. 6, 2016    (DE) .......................... 202016103608.9

(51) Int. Cl.
*B29C 48/694*    (2019.01)
*B29C 48/27*    (2019.01)
(Continued)

(52) U.S. Cl.
CPC ............. *B01D 24/14* (2013.01); *B01D 24/38* (2013.01); *B01D 24/4884* (2013.01);
(Continued)

(58) Field of Classification Search
CPC . B29C 48/2735; B29C 48/503; B29C 48/694; B29C 48/03; B01D 29/6476;
(Continued)

(56) References Cited

U.S. PATENT DOCUMENTS 2,497,010 A    2/1950    Morin
2,592,972 A    4/1952    Strassheim
(Continued)

FOREIGN PATENT DOCUMENTS

CN    1898002 A    1/2007
CN    104548702 A    4/2015
(Continued)

OTHER PUBLICATIONS

EP0078064A1—EPO Machine Translation (Year: 2019).*
(Continued)

*Primary Examiner* — Patrick Orme
(74) *Attorney, Agent, or Firm* — Baker & Hostetler LLP

(57) ABSTRACT

A filtering device for removing dirt particles and contaminants from a plastic melt is disclosed. The filtering device includes a housing having a filter chamber, an inlet for feeding plastic melt, an outlet for channeling plastic melt out, and a dirt outlet for discharging dirt particles from the housing. The filtering device also includes a filter element arranged in the filter chamber to retain any dirt particles contained in the stream of melt, and a cleaning unit for cleaning the filter element of dirt particles retained by means of the filter element. The cleaning unit having a cleaning head with a scraper member for detaching dirt particles from the filter element. The scraper member is coupled to a servomechanism to press the scraper member onto the surface of the filter element. The servomechanism has at least one bellows cylinder including a foot section, a head section, a deformable bellows element, and a pressure chamber of variable volume.

18 Claims, 6 Drawing Sheets

(51) Int. Cl.
*F04B 43/00* (2006.01)
*B01D 29/64* (2006.01)
*B29C 48/50* (2019.01)
*B01D 24/14* (2006.01)
*B01D 24/38* (2006.01)
*B01D 24/48* (2006.01)
*B29C 48/03* (2019.01)

(52) U.S. Cl.
CPC ........ *B29C 48/2735* (2019.02); *B29C 48/694* (2019.02); *F04B 43/0009* (2013.01); *B01D 29/6476* (2013.01); *B29C 48/03* (2019.02); *B29C 48/503* (2019.02)

(58) Field of Classification Search
CPC .... B01D 24/14; B01D 24/38; B01D 24/4884; F04B 43/0009
See application file for complete search history.

(56) References Cited

U.S. PATENT DOCUMENTS

| | | | |
|---|---|---|---|
| 4,470,904 | A | 9/1984 | Gail et al. |
| 6,378,705 | B1 | 4/2002 | Bacher et al. |
| 2007/0068867 | A1 | 3/2007 | Ettlinger |
| 2015/0114898 | A1 | 4/2015 | Mavroidakos et al. |
| 2016/0136546 | A1 | 5/2016 | Ettlinger et al. |
| 2016/0375380 | A1 | 12/2016 | Tiwari et al. |

FOREIGN PATENT DOCUMENTS

| | | | |
|---|---|---|---|
| CN | 105473204 A | 4/2016 | |
| DE | 0819132 C | 10/1951 | |
| DE | 3239030 A1 | 9/1983 | |
| DE | 4308685 A1 | 4/1994 | |
| EP | 0078064 A1 * | 5/1983 | ........... B01D 29/111 |
| EP | 0078064 A1 | 5/1983 | |
| WO | 97/26973 A1 | 7/1997 | |
| WO | 2015/138015 A1 | 9/2015 | |

OTHER PUBLICATIONS

European search report dated Nov 28, 2017 for EP Application No. 17180132.
European Patent Application No. 17180132.7; Office Action 94(3); dated Sep. 20, 2019.

* cited by examiner

FILTERING DEVICE AND CLEANING UNIT FOR REMOVING DIRT PARTICLES FROM A FILTER ELEMENT OF A FILTERING DEVICE

CROSS-REFERENCE TO RELATED APPLICATION

This application claims priority to foreign German Patent App. No. DE 202016103608.9, filed Jul. 6, 2016, the disclosure of which is incorporated by reference in its entirety.

FIELD OF THE INVENTION

The invention relates to a filtering device for removing dirt particles and impurities from a plastic melt, comprising a housing having a filter chamber and an inlet for feeding plastic melt into the filter chamber and an outlet for channeling plastic melt out of the filter chamber and a dirt outlet for discharging dirt particles from the housing, a filter element which is arranged in the filter chamber and through which the stream of melt can be channeled and which is adapted to retain any dirt particles contained in the stream of melt, and a cleaning unit for cleaning the filter element of dirt particles retained by means of the filter element, said cleaning unit having a cleaning head with at least one scraper member for detaching dirt particles from the filter element, wherein said cleaning head and said filter element are movable relative to each other and can be brought into contact with each other at least temporarily, wherein the at least one scraper member is coupled to a servomechanism which is adapted to press the scraper member onto the surface of the filter element.

The invention further relates to a cleaning unit for removing solids from a filter element of a filtering device as described above.

BACKGROUND

Using filtering devices of the aforementioned type to filter dirt particles or impurities in the form of metal parts from a stream of material, in particular from a continuously flowing plastic melt, is known from the prior art. In the recycling of plastic waste, in particular, where metal parts and other troublesome dirt particles are often found among the comminuted plastic parts, it is necessary to separate these before the plastic is processed to make new products. This is done by heating the plastic waste to convert it into a plastic melt, and by feeding that plastic melt into a filtering device comprising a cleaning unit of the aforementioned type. The cleaned plastic melt is then fed to an extrusion die.

Such a filtering device is known from DE 43 08 685 C2, for example, which comprises a housing having a filter chamber, an inlet through which the stream of material to be cleaned flows to the filter chamber, and an outlet through which the cleaned stream of material is discharged from the filter chamber. A filter element through which the stream of melt is channeled for cleaning is arranged in the filter chamber. The filter element is adapted to retain any dirt particles or impurities, such as solids, which exceed a particular particle size, and which then accumulate on the "dirt side" of the filter element. The dirt particles retained on the filter element are transported away by means of a cleaning head of a cleaning unit in the direction of a dirt outlet on the filtering device. For that purpose, the cleaning head has one or more scraper members which are brought at least temporarily into contact with the filter element of the separation device. To ensure reliable contact between the scraper members and the filter element, the scraper member is mechanically coupled to a servomechanism which is adapted to move the scraper member substantially perpendicularly to the surface of the filter element. More specifically, the scraper member is pressed continuously onto the surface of the filter element by the servomechanism.

Biasing the scraper members in the direction of the filter element by means of springs is known from DE 43 08 685 C2. Due to the high temperatures that are needed in order to keep the plastic melt in a free-flowing state, the components of the separation device are permanently subjected to temperature effects. For that reason, the biasing force of the springs acting on the scraper members may decrease with increasing use. The wear on the scraper members as a result of their use also causes a decrease in the force with which they are pressed against the filter element. Variations in pressure inside the filter chamber, due to their counteracting the spring force, can also lead to insufficient contact of the scraper members with the surface of the filter element, which then results in the cleaning unit not removing or cleaning sufficiently.

A device for filtering material mixtures from plastic melts, and which includes a hollow cylindrical filter element arranged inside a housing, is also known from EP 1 697 018 B1. The plastic melt flows from the outside to the inside through the filter element for filtering out impurities. A stripper is arranged on the outside of the filter element and is assigned to an actuator for adjusting the pressure with which the stripper is pressed onto the filter element. The pressing force is adjusted according to a pressure that is detected by means of a pressure transducer arranged at a connection port of the device.

SUMMARY OF THE INVENTION

The object of the present invention is to provide a filtering device and a cleaning unit for removing dirt particles from a plastic melt and with which it is possible to remove dirt particles reliably from the plastic melt regardless of the wear on the scraper members and any variations in pressure in the filter chamber.

In a filtering device for removing dirt particles from a plastic melt, the invention achieves its object with the features according to claim 1. In particular, the servomechanism for the scraper member has at least one bellows cylinder, comprising a foot section which has at least one opening for a fluid-channeling connection to a pressure source, a head section which can be moved along a predetermined adjustment path relative to the foot section, a deformable bellows element which is sealingly connected to the foot section and the head section, and a pressure chamber of variable volume which is adapted to move the head section relative to the foot section depending on the pressure prevailing in the pressure chamber, said pressure chamber being connectable to the pressure source.

The invention makes use of the discovery that a bellows cylinder provides an actively controllable adjusting means of a servomechanism on the filtering device, with which it is possible to exert a force on the scraper member in a targeted manner. It is also possible in this way to control in a targeted manner the amount of pressing force with which the scraper member is pressed onto the filter element. This ensures that the scraper members exert a uniform pressing force against the surface of the filter element, regardless of the service life of the scraper member and its concomitant degree of wear. Sealless adjustment of the bellows cylinder is also ensured, with the result that pressure losses are reduced to a minimum or prevented entirely. The invention avoids the use of seals that are exposed to friction during operation, such as O-ring seals. Furthermore, the O-rings made of polymer materials, which are normally used, are temperature-resistant to only a limited extent. It is also possible by means of the actively controlled bellows cylinder to compensate for different pressures in the filter chamber, which may affect the pressing force between the scraper member and the filter element. In one embodiment of the invention, the filtering device has one filter element which is stationary inside the filter chamber and a cleaning unit which rotates inside the filter chamber. In an alternative configuration of the filtering device, the filtering device has a stationary cleaning unit having at least one scraper member, and a filter element which rotates relative to the cleaning unit and thus inside the filter chamber.

In a preferred development of the invention, a guide mechanism is provided for the head section, which is formed inside the pressure chamber and is adapted to guide the head section along the adjustment path. The guide mechanism for the head section ensures that force is exerted in a targeted manner on the scraper member which is coupled to the bellows cylinder. The force preferably acts parallel to the longitudinal axis of the bellows cylinder. In one embodiment, the guide mechanism is implemented by components of the bellows cylinder itself. In an alternative embodiment, the guide mechanism for the head section is formed by regions of the cleaning head that receives the bellows cylinder. In particular, any forces acting transversely to the direction of movement of the head section are absorbed by the guide mechanism.

In one embodiment, the guide mechanism may be formed inside the pressure chamber. This allows the bellows cylinder to be of compact design and for it to be arranged in a space-saving manner inside a filtering device according to the invention. The component regions forming the guide mechanism are preferably arranged on the longitudinal axis of the bellows cylinder. The corresponding guide faces of the guide mechanism are preferably formed by component regions of the stationary foot section and of the head section which is movable relative to the foot section.

The guide member is preferably disposed on the foot section and the guided portion on the head section. The guide member and the guided portion each have two guide surfaces aligned parallel to each other, with which transverse forces are absorbed in at least one direction preferably perpendicularly to the direction of adjustment. In one possible variant of the cleaning unit, the guide member on the foot section preferably has two guide surfaces facing each other, and the guided portion on the head section has two guide surfaces facing away from each other.

According to one development of the cleaning unit according to the invention, the guided portion has a guide bar running across the middle and extending in the direction opposite to the adjustment path, and the guide member has a guide groove which receives the guide bar preferably in sections on both sides. In one embodiment, a guide mechanism with which any force directed and acting transversely to the direction of adjustment of the head section can be absorbed is provided by the operatively connected regions of the foot section and the head section. In another embodiment, the head section is preferably guided to the foot section in a direction transverse to the direction of adjustment of the head section, and is guidingly supported in a direction perpendicular to said direction, for example by a guide surface of a receptacle on the cleaning mechanism according to the invention.

In a preferred development of the invention, means for limiting the adjustment path for the head section relative to the foot section is provided. The adjustment path can be advantageously limited in the direction of adjustment by the means for limiting the adjustment path, also called an adjustment limiter. In this way, it is possible to prevent excessive deformations and potential damage to the deformable bellows element connecting the head and foot sections to each other.

The means for limiting the adjustment path is preferably formed in the region of the guide mechanism for the foot section and the head section, with the result that the compact design is not adversely affected by any adjustment limiter which is provided separately from the guide mechanism. In one alternative embodiment, the adjustment limiter may also be disposed outside and along the bellows element. For example, the adjustment limiter may comprise one or more cable members, the one end of which is connected to the foot section and the opposite end to the head section.

In a development of the cleaning unit according to the invention, the means for limiting the adjustment path, also called an adjustment limiter, has a movable stop member disposed on the guide member or on the guided portion, said stop member cooperating with a stop face on the guided portion or on the guide member, said stop face limiting the adjustment path in the direction of adjustment. Providing a movable stop member which comes into contact with a stop face on the foot section when the maximum adjustment path has been travelled, preferably on the movable head section, allows the adjustment limiter according to the invention to be of simple constructional design. Providing components to be separately connected or affixed to the head section and the foot section is thus avoided. The movable stop member is embodied, for example, as a material projection which preferably comes into contact, after the maximum adjustment path has been travelled, with a stop face on an undercut of the foot section that is stationary relative to the cleaning unit.

The head section preferably has a material recess extending in the direction of the adjustment path, preferably an elongate hole into which a pin element projects or protrudes, or in which a pin element is disposed, the ends of which are preferably connected to the stationary foot section. The pin element extending through the material recess on the head section, in particular, forms lateral guide surfaces for the material recess on the head section. The pin element also serves as a stop member for the head section of the bellows cylinder according to the invention, said head section being movable relative to the foot section.

In another development of the filter device according to the invention, the bellows element is a gaiter made preferably of a metal material which is connected at its ends to the foot section and to the head section, preferably by a material fit. Using a gaiter ensures long-term operational reliability of the bellows element and allows the prevention of any pressure loss, in contrast to piston cylinder arrangements with sealing gaskets. Using a gaiter also ensures that any increase in pressure is converted in a targeted manner into a change in the length of the bellows element and thus into an adjustment in the direction of adjustment that is provided. It is preferred that the gaiter is connected at one end to the foot section, which is preferably stationary in relation to the cleaning unit, and at the other end to the movable head section, in a material fit, and in particular that the gaiter is welded to the latter. The elastically deformable gaiter is of generally cylindrical design and is thus shaped like a corrugated pipe.

In another preferred development of the filter device according to the invention, the cleaning unit has a knife drum which is rotatable about a rotational axis and which has an outer surface which is substantially cylindrical and on which a plurality of scraper members are preferably arranged. Due to the cylindrical design, the scraper members arranged on the outer surface of the knife drum are moved along the filter element by rotary motion, thus allowing dirt particles to be reliably detached and preferably uniform removal of the dirt particles retained on the dirt side of the filter element. The knife drum preferably has a circular cross-section which is preferably uniform in the longitudinal direction of the knife drum. The scraper members arranged on the knife drum extend at a predetermined angle ranging between 40 and 85 degrees to the longitudinal direction of the knife drum. When the cleaning head rotates about its axis, the dirt particles on the dirt side of the filter element are moved relative to the surface of the filter element by the scraper members extending at an angle thereto. The removal of the dirt particles on the filter element is dependent, in particular, on the pitch angle of the scraper members on the cleaning head.

The cleaning unit, and preferably the cleaning head, preferably has a supply channel which is connectable to a pressure source and which preferably extends parallel to the axis of rotation, from which supply channel a plurality of distribution channels for supplying pressure to the bellows cylinder extend substantially in the radial direction, preferably at intervals along the rotational axis and/or at different angles to the rotational axis. Four bellows cylinders provided on the cleaning head of the cleaning unit according to the invention form a star-shaped bellows cylinder arrangement. In relation to the longitudinal axis of the cleaning head which rotates inside the filter chamber, the four bellows cylinders are arranged in a plane perpendicularly to the longitudinal axis. The four bellows cylinders are arranged equidistantly apart around the rotational axis in such a way that immediately adjacent bellows cylinders are oriented approximately at right angles to each other. The bellows cylinders oriented in a plane and at right angles to one another form a first group of bellows cylinders. In relation to the longitudinal axis of the cleaning head, a second group of bellows cylinders is arranged with an offset in the axial direction to the first group. The second group of bellows cylinders, which preferably and likewise comprises four bellows cylinders, with adjacent bellows cylinders being oriented approximately at right angles to each other, is further offset to the first group of bellows cylinders by an angle of approximately 45 degrees about the axis of rotation. The cleaning head preferably includes a third group of bellows cylinders, which is arranged in relation to the longitudinal axis with a further offset in the axial direction to the second group of bellows cylinders. The first and the third group of bellows cylinders are arranged congruently in respect of their angular orientation about the longitudinal axis of the cleaning head. The spacing between the first and the second group is identical to the spacing between the second and the third group of bellows cylinders. In one variant of the invention, the cleaning head has an arrangement of at least three, four, five or more groups of bellows cylinders. Every bellows cylinder is mechanically coupled to a scraper member disposed on the outer surface of the cleaning head. The cleaning head preferably has a total of five groups each comprising four bellows cylinders, such that a total of 20 scraper members are uniformly distributed on the outer surface of the cleaning head.

The scraper members, which in one embodiment of the invention are embodied as scraper blades, are preferably coupled via a force transmission means to the head section of the respectively assigned bellows cylinder. Direct contact and thus an excessive effect on temperature is thus avoided between the scraper members and the bellows cylinders which press the scraper members onto the filter element and which are preferably accommodated inside the cleaning head. Examples of force transmission means that can be used include tappets, chains, pull rods, or pipelines filled with a pressurizing medium.

In one development of the present invention, the cleaning unit is embodied in multiple parts and has at least one inner shaft member with receptacles for the bellows cylinders and an outer knife drum which forms the outer surface of the cleaning unit and which separates the bellows cylinder preferably fluid-sealingly from the plastic melt to be cleaned. The knife drum, which is preferably in the shape of a hollow cylinder, with the scraper members disposed on the outside thereof, forms a kind of protective space for the bellows cylinders disposed in the receptacles of the shaft member. The bellows cylinders are preferably encapsulated by the knife drum. The shaft member preferably has a number of receptacles corresponding to the number of groups of bellows cylinders and which are preferably embodied as material recesses in the form of a cylindrical cavity on the outer diameter of the shaft member. The multi-part design of the cleaning head also ensures simplified maintenance of the filtering device according to the invention.

In one embodiment of the filter device according to the invention, it is preferred that the force transmission means is a tappet which extends substantially radially through a section of the knife drum, wherein said tappet is accommodated preferably sealingly in the knife drum. The spacing between the scraper members disposed on the outside of the knife drum and the bellows cylinders disposed on the inner shaft member is preferably bridged by means of the tappet. The tappets are preferably rod members with a cylindrical cross-section, which transmit the force generated in the bellows cylinder in the direction of the scraper members. The scraper members are preferably pressed from their rear side or actuation side onto the surface of the filter element by the tappets that each interact with a respective bellows cylinder. The actuation side of the scraper members is preferably on the opposite side from the scraper edge, which is adapted to the contour of the filter element.

In one preferred variant of the filter device, the movable head section of the bellows cylinder is supported displaceably over its entire adjustment path in the receptacle for the bellows cylinder on the inner shaft member. This provides an additional guide to the guide mechanism that is formed between the preferably stationary foot section and the movable head section. The receptacle on the inner shaft member is preferably in the form of a material recess with a preferably circular cylindrical cross-section, in which the movable head section is guided in part at least. A portion of the head section is preferably guided in its entirety inside the receptacle.

In another variant of the invention, the filter element has a screen which is fixed inside the filter chamber and which is arranged approximately equidistant around the outer surface of the cleaning unit. The screen is preferably in the shape of a hollow cylinder, the inner surface of which forms the "dirt side" of the filter element for filtering out the dirt particles or impurities, for example solids, and along which the scraper members of the cleaning unit are moved. On its outer surface facing away from the dirt side, the screen preferably has one or more reinforcing profiles which counteract any deformation of the screen. The reinforcing profiles are preferably embodied as webs extending in the radial direction along the outer surface of the screen.

The screen preferably has passages which widen in cross-section in the direction in which the plastic melt passes through them, thus preventing any congesting or clogging of the passages through the screen. The passages are preferably of circular cross section. Screens with different sizes of passages are used, depending on the level of filter quality to be achieved.

In another development of the invention, a conveying screw for discharging the dirt particles is arranged in the region of the dirt outlet and is coupled to the cleaning unit. The dirt particles retained on the dirt side of the filter element by the cleaning unit are removed from the filter element and transported away in the direction of a dirt outlet. The dirt particles are removed preferably continuously in the direction of the dirt outlet by further dirt particles being constantly removed from the inner side of the filter element and inching forward. A conveying screw whose rotational movement matches the rotational movement of the cleaning head of the cleaning unit is used to discharge the dirt particles from the filter chamber. The conveying screw is preferably coaxial with the longitudinal axis of the cleaning head. In one preferred embodiment, the conveying screw and the cleaning head are coupled directly and mechanically with each other. An electrical drive causes rotation of the cleaning head moving inside the filter chamber and rotation of the conveying screw, wherein the speed of rotation can preferably be set by means of frequency converters. The conveying screw has at least one helix that spirals around a shaft portion of the conveying screw.

According to a further aspect, the invention relates to a cleaning unit for removing dirt particles from a filter element of a filtering device, in particular of a filtering device according to one of the preferred embodiments described above, comprising a cleaning head with at least one scraper member for detaching dirt particles from the filter element, wherein said cleaning head and said filter element are movable relative to each other and can be brought into contact with each other at least temporarily, wherein the at least one scraper member is coupled to a servomechanism which is adapted to press the scraper member onto the surface of the filter element.

The cleaning unit according to the invention achieves the initially described object by providing the servomechanism with at least one bellows cylinder comprising a foot section having at least one opening for a fluid-channeling connection to a pressure source, a head section which can be moved along an adjustment path relative to the foot section, a deformable bellows element which is sealingly connected to the foot section and to the head section, and a pressure chamber of variable volume which is adapted to move the head section relative to the foot section depending on the pressure prevailing in the pressure chamber, said pressure chamber being connectable to the pressure source.

The invention according to this aspect is based on the discovery that it is possible, with the aid of one and preferably a plurality of bellows cylinders, to control in a targeted manner the amount of pressing force with which the scraper member or scraper members on the cleaning unit act on the surface of the filter element. In this way, it is possible to compensate for wear on the scraper members that results the longer they are in use. Sealless adjustment of the bellows cylinder is also ensured, with the result that losses in pressure are reduced to a minimum or prevented entirely. The bellows element is preferably a metal gaiter which is connected to, and in particular welded to, the foot section and to the head section of the bellows cylinder in a material fit. The foot section, which is preferably fixed to the cleaning unit, has an opening which extends into the pressure chamber inside the bellows cylinder, and through which a pressurizing medium provided by a pressure source connectable to the cleaning unit according to the invention can be fed. The pressurizing medium flowing into the pressure chamber of the bellows cylinder acts on one or more surface regions of the movable head section. The force resulting from the pressure in the pressure chamber moves the head section relative to the foot section, with the bellows element in the form of a gaiter being stretched in the longitudinal direction.

According to a further aspect, the invention also relates to a bellows cylinder for deployment in plastics processing machines and devices, in particular to actuate and/or adjust a movable component of a plastics processing machine or device, comprising a foot section having at least one opening for a fluid-channeling connection to a pressure source, a head section which can be moved along a predetermined adjustment path relative to the foot section, a deformable bellows element which is sealingly connected to the foot section and to the head section, and a pressure chamber of variable volume which is adapted to move the head section relative to the foot section depending on the pressure prevailing in the pressure chamber, wherein the pressure in the pressure chamber can be controlled via the pressure source. Such a bellows cylinder according to the invention can be deployed in plastics processing machines or devices in a variety of ways, for example as an adjusting means, as an actuator or as a drive. The bellows cylinder with its bellows element allows sealless adjustment of the head section and the foot section relative to each other. Compared to seals made of polymer materials, the bellows element also has improved temperature resistance.

In one embodiment, the head section and the bellows element preferably delineate the pressure chamber of variable volume, at least in part. In another variant, the pressure chamber is delineated by the foot section and the head section, the gaiter performing the function of a sealing member between the foot section and the head section. According to a preferred development of the invention, a means for limiting the adjustment path for the head section is provided on the bellows cylinder, thus allowing any excessive deformation of the bellows element and hence any associated defect of the bellows cylinder to be prevented.

The preferred embodiments and developments described for the filtering device according to the invention are also and simultaneously preferred embodiments of the cleaning unit according to the invention and of the bellows cylinder according to the invention. Preferred embodiments and developments described herein in respect of the cleaning unit and for the bellows cylinder, and which relate to the filtering device, are at the same time preferred embodiments of the filtering device.

According to another aspect, the invention likewise relates to the use of a bellows cylinder to actuate and/or adjust a movable component in a plastics processing machine, in particular according to any one of the preferred embodiments described above, in particular to adjust a scraper member substantially perpendicularly to the surface of a filter element, and preferably to press a scraper member onto the surface of a filter element in order to filter out dirt particles from a plastic melt. With regard to the advantages and the preferred embodiments of this use, according to the invention, which are the same as the advantages and preferred embodiments of the filtering device or the cleaning unit, reference is made to the statements made in the foregoing.

BRIEF DESCRIPTION OF THE DRAWINGS

The invention shall now be described in greater detail with reference to a preferred embodiment and the attached Figures, in which.

DETAILED DESCRIPTION

Figure 1:
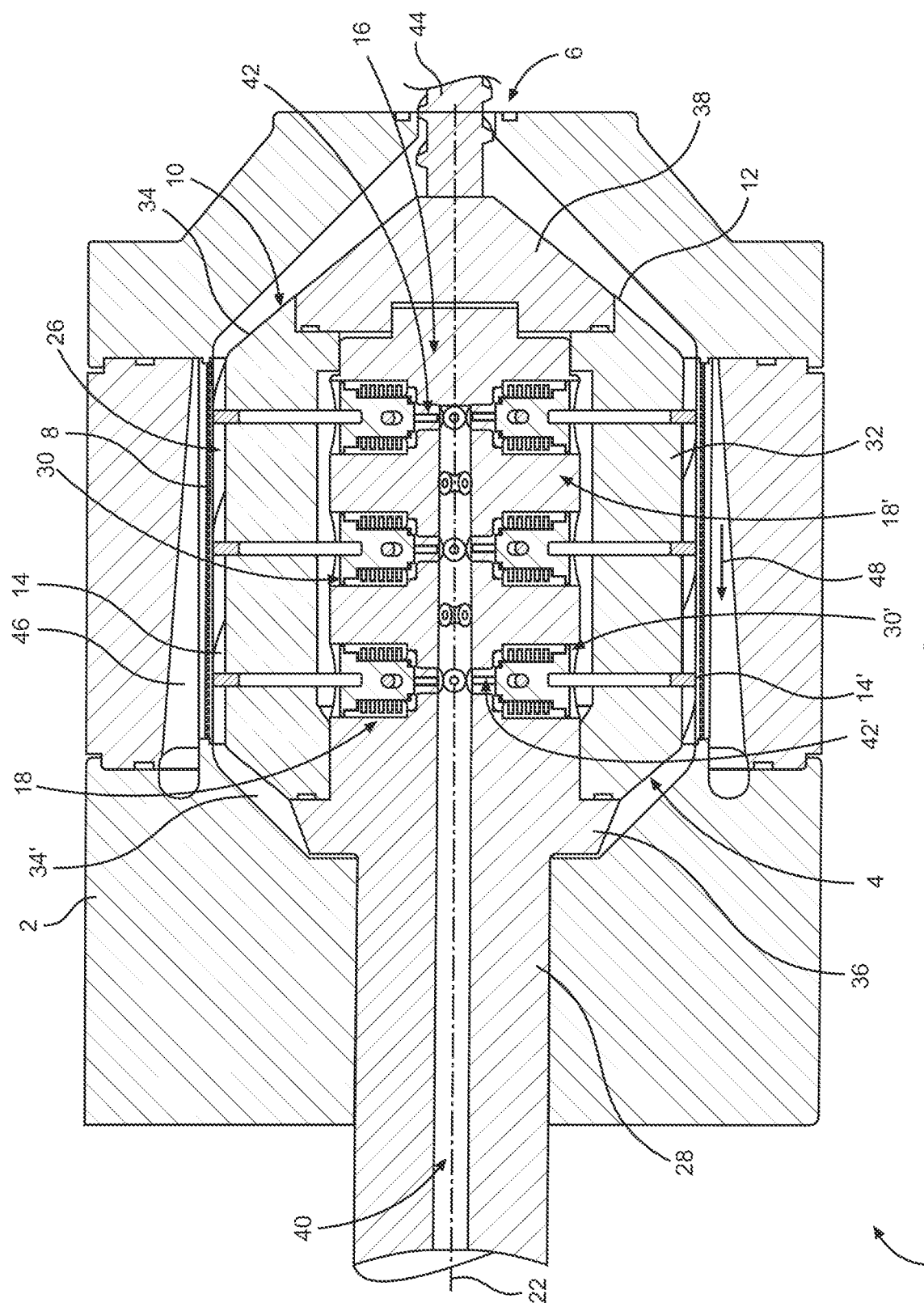
FIG. 1 shows, in longitudinal section, a view of the inventive filtering device with cleaning unit.

FIG. 1 shows a simplified view of a filtering device 1 for removing dirt particles from a plastic melt and comprising a housing 2 having a filter chamber 4. Housing 2 as an inlet, not shown in any further detail, for feeding the plastic melt to be cleaned into filter chamber 4, and an outlet, not shown, for channeling the cleaned plastic melt out of filter chamber 4. Housing 2 also has a dirt outlet 6, through which the dirt particles filtered out of the plastic melt can be discharged from housing 2. A filter element 8 for filtering dirt particles from the plastic melt, and through which the plastic melt can be channeled, is disposed in housing 2 and filter chamber 4. The filter element has a "dirt side" 8', on which the dirt particles accumulate and on which the dirt particles are retained, as well as a "clean side" 8" (FIG. 3) on which the cleaned plastic melt flows off.

Filtering device 1 also has a cleaning unit 10 for cleaning filter element 8 of the dirt particles removed from the plastic melt and retained on dirt side 8'. Cleaning unit 10 comprises a cleaning head 12 with a plurality of scraper member 14, 14' for detaching dirt particles which have accumulated on filter element 8 and preferably for guiding the dirt particles in the direction of dirt outlet 6. Cleaning head 12 can be moved and preferably rotated inside filter chamber 4 relative to filter element 8 by means of an electrical drive unit that is not shown in any further detail. The drive unit preferably has an electric motor. Cleaning head 12, with its scraper member 14, 14', is at least partly and preferably continuously in contact with the filter element.

To ensure reliable contact of scraper members 14, 14' and thus uniform cleaning action of filter element 8 by cleaning unit 10, cleaning unit 10 includes a servomechanism 16 which is coupled mechanically to each scraper member 14, 14' and which is adapted to press scraper member 14, 14' onto the dirt side 8' of filter element 8. Cleaning unit 10 preferably has a number of bellows cylinders 18, 18' corresponding to the number of scraper members 14, 14' disposed on cleaning head 12 and which exert a pressing force on scraper members 14, 14' in the direction of filter element 8. The force exerted by bellows cylinders 18, 18' is dependent on the pressure acting in pressure chamber 20 (FIG. 3) of bellows cylinder 18, 18', which can be controlled by a pressure source that is not shown in any further detail. Pressure chamber 20 is connectable to the pressure source in a manner which is known to a skilled person. Cleaning unit 10 has a knife drum 32 which is rotatable about a rotational axis 22 and which has an outer surface 26 which is substantially cylindrical and on which scraper members 14, 14' are arranged.

Cleaning unit 10 is embodied in multiple parts and has an inner shaft member 28 with receptacles 30, 30' for bellows cylinders 18, 18'. The outer surface 26 of cleaning unit 10 is formed by a knife drum 32, which separates the bellows cylinders 18, 18' on inner shaft 28 fluid-sealingly from the plastic melt on the outside of knife drum 32. Knife drum 32 is embodied as a hollow cylinder and has a cylindrical outer surface of constant cross-section, and is adjoined on either side by a taping conical portion 34, 34'. As can be seen from FIG. 1, knife drum 32 abuts a flange section 36 of inner shaft member 28 and is fixed to inner shaft member 28 by a cap member 38.

Inside the cleaning head 12 of shaft member 28, cleaning unit 10 has a supply channel 40 extending parallel to, and preferably coaxially with the rotational axis 22 of cleaning head 12. Supply channel 40 can be connected to the pressure source, which is not shown. With preferably equal spacing along supply channel 40 on inner shaft member 28, a plurality of distribution channels 42, 42' extend in a substantially radial direction at different respective angles to the rotational axis. Distribution channels 42, 42' connect supply channel 40 and bellows cylinders 18, 18' disposed in receptacles 30, 30' so that there is fluidic communication between them. As FIG. 1 also shows, a conveying screw 44 is arranged in the region of dirt outlet 6 and is coupled to cleaning unit 10. By means of conveying screw 44, the dirt particles removed by cleaning unit 10 on filter element 8 are removed and discharged from filter chamber 4.

Figure 2:
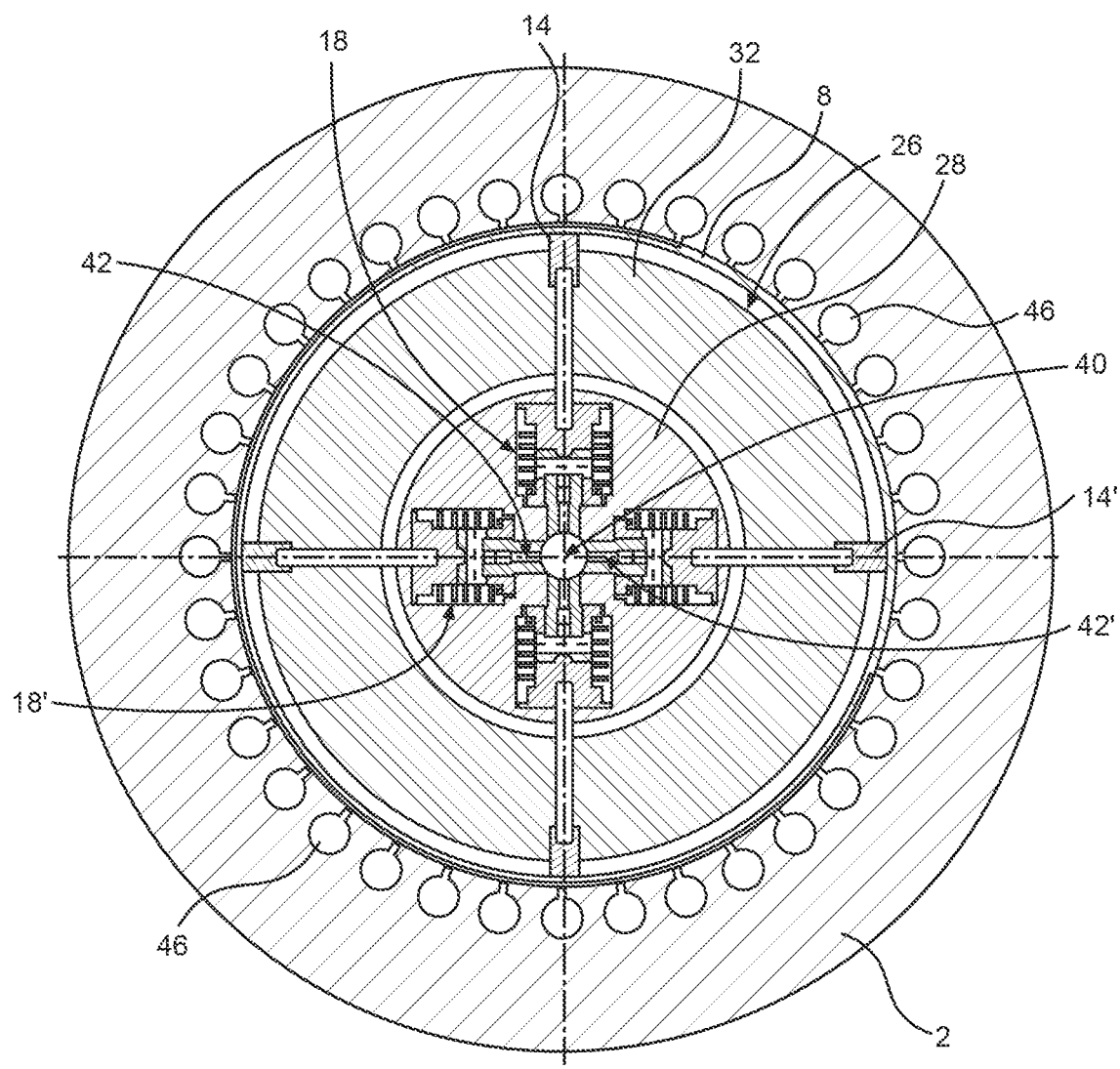
FIG. 2 shows a cross-sectional view of the inventive filtering device according to FIG. 1, transverse to the longitudinal axis.

FIG. 2 shows filter device 1 according to the invention in cross-section. As FIG. 2 clearly illustrates, four bellows cylinders 18, 18' and scraper members 14, 14' operatively connected to the bellows cylinders are arranged in cleaning unit 10 in a plane transverse to the longitudinal axis of cleaning head 12. In the embodiment shown, adjacent bellows cylinders 18, 18' are oriented at an angle of approximately 90 degrees relative to one another. The four visible bellows cylinders 18, 18' form a first group of bellows cylinders. Another group of bellows cylinders in such a star-shaped arrangement is arranged in the longitudinal direction at a distance upstream or downstream from the depicted group of bellows cylinders, but is not visible here. This other group of bellows cylinders is likewise oriented in a plane transversely to the longitudinal axis of cleaning head 12. However, the group of bellows cylinders not shown here is arranged about the longitudinal axis but offset by an angle of 45 degrees to the group of bellows cylinders that is shown.

Figure 3:
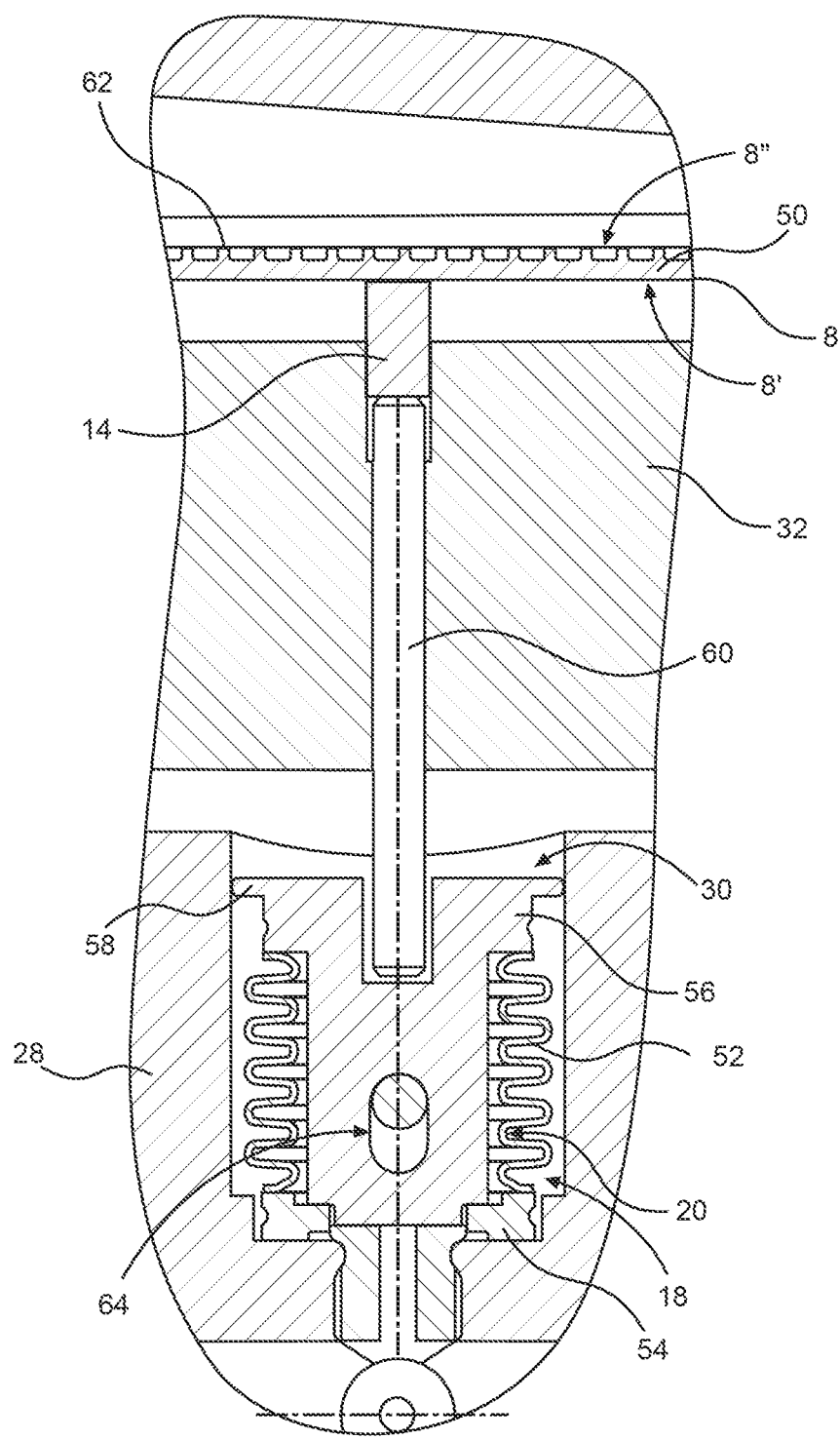
FIG. 3 shows a detailed view, in cross-section, of a bellows cylinder arranged in a receptacle on the cleaning unit.

As can also be seen from FIG. 2, a plurality of distribution channels 42, 42' is provided for a fluid-channeling connection between bellows cylinders 18, 18' and supply channel 40 extending coaxially with the longitudinal axis of the cleaning head. In relation to outer surface 26 from which scraper members 14 project, filter element 8 in filter chamber 4 is arranged with a uniform spacing around knife drum 32. In housing 2, on the clean side 8" (FIG. 3) of the filter element, a plurality of discharge channels 46 for the cleaned plastic melt are formed, which extend in the longitudinal direction of filtering device 1 and which, as can be seen from FIG. 1, widen in cross-section in the direction of flow 48 of the plastic melt FIG. 3 shows a detailed view of a bellows cylinder 18 according to FIG. 1, which is disposed in receptacle 30 on the inner shaft cylinder 28 of cleaning head 12, and scraper member 14 which is coupled to the bellows cylinder and which contacts filter element 8. Filter element 8 has a screen 50 which in one embodiment has cylindrical passages for the plastic melt to be cleaned. In one preferred embodiment, the cross-sections of the passages widen as the plastic melt passes through them. In the embodiment shown, bellows cylinder 18 has a gaiter 52 which is made of a metal material and which is connected at one end to a foot section 54 and at the opposite end to a movable head section 56, in a material fit. The movable head section 56 of bellows cylinder 18 is supported displaceably by means of a guide flange 58 over its entire adjustment path along a section of receptacle 30 of inner shaft member 28.

As can also be seen from FIG. 3, scraper member 14 is mechanically coupled via a movably supported tappet 60 to the movable head section 56 of bellows cylinder 18. Tappet 60 extends substantially in the radial direction through a section of the knife drum 32, each tappet 60 being guided sealingly inside knife drum 32 in the direction of bellows cylinder 18. As can be seen from FIG. 3, screen 50 of filter element 8 has a plurality of radially projecting reinforcing webs 62 its clean side 8".

Gaiter 52 has a means 64 for limiting adjustment path. The purpose of said means 64, also referred to as an adjustment limiter and described in more detail below, is to counteract any overstretching of gaiter 52.

Figure 4:
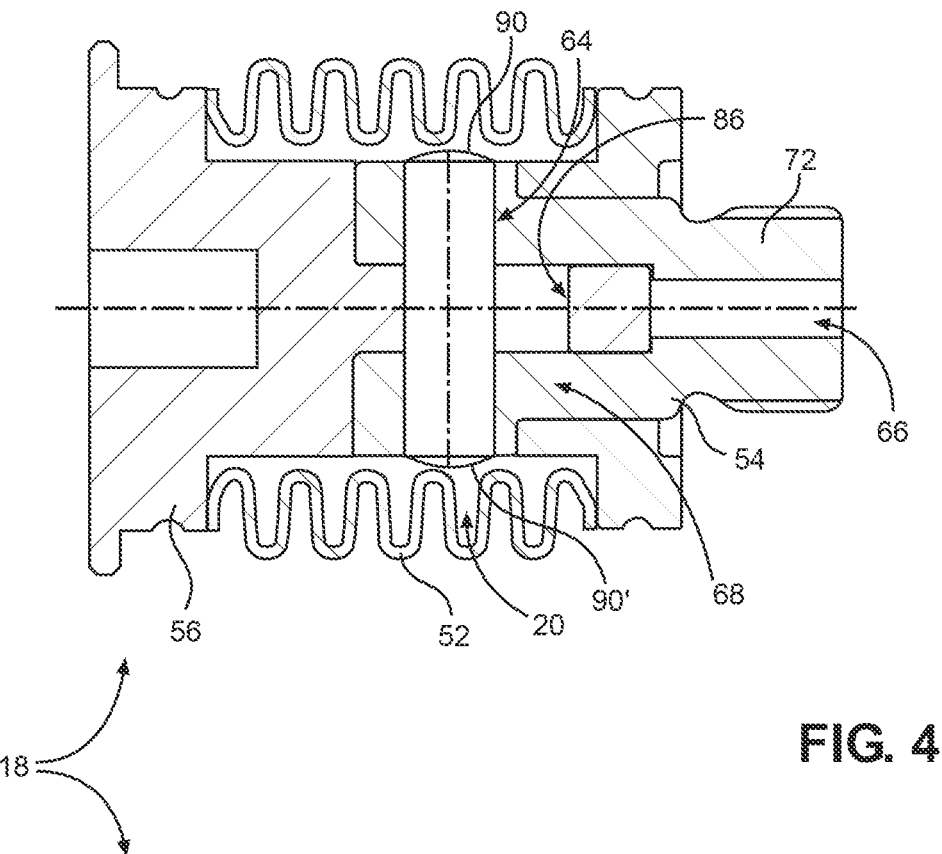
FIG. 4 shows a cross-sectional view of the bellows cylinder according to the invention, in retracted position.
Figure 5:
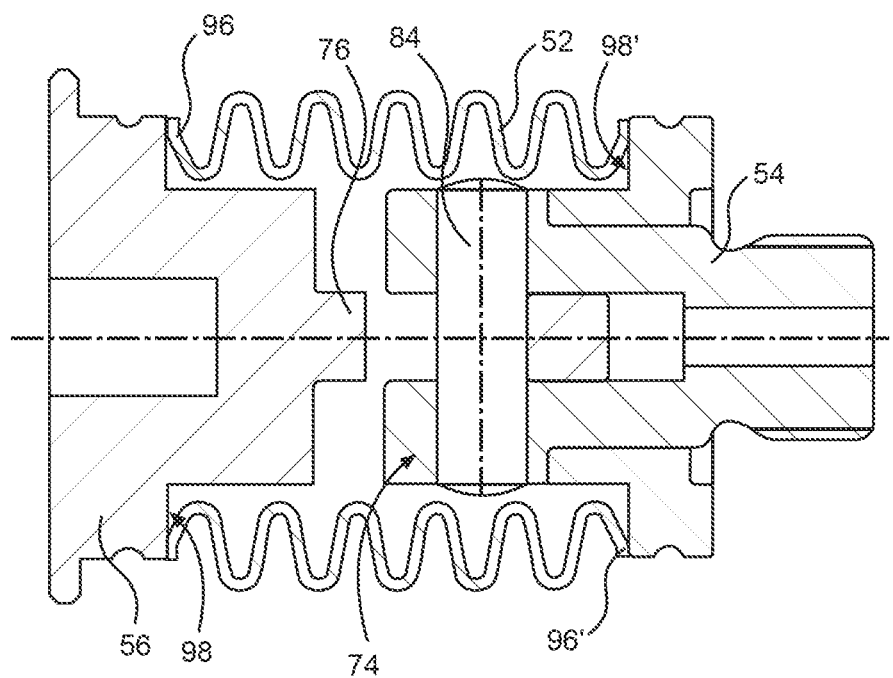
FIG. 5 shows a view of the bellows cylinder according to FIG. 4, in its extended position.

FIGS. 4 and 5 show a bellows cylinder 18 as used in the filtering device according to the invention 1 (FIG. 1) and which includes a foot section 54 having one opening 66 for a fluid-channeling connection to a pressure source. Foot section 54 shown here is fixedly accommodated in cleaning unit 10. Bellows cylinder 18 also includes a head section 56 which can be moved relative to the foot section along an adjustment path. As can be seen from FIGS. 4 and 5, the head and foot sections 54, 56 form a guide mechanism 68 for the movable head section 56. Bellows cylinder 18 also includes a deformable bellows element in the form of gaiter 52, which is stretched in the longitudinal direction when the pressure increases and there is a concomitant increase in volume. In the embodiment shown, the stationary foot section 54, the movable head section 58 and gaiter 52 limit variable-volume pressure chamber 20, which is adapted to move the head section relative to the foot section depending on the fluid pressure prevailing in the pressure chamber. The pressure in pressure chamber 20 is controlled, for example, by a pressure source which can be connected to filtering device 1. In the embodiment shown, guide mechanism 68 is formed inside pressure chamber 20. Means 64 for limiting the adjustment path is disposed in the region of the guide mechanism formed by portions of foot and head sections 54, 56. In a preferred embodiment, foot section 54 of bellows cylinder 18 has a connecting journal 72, by means of which bellows cylinder 18 can be attached to a receptacle in cleaning unit 10. Guide mechanism 68 has at least one guide member 74 disposed on foot section 54, by means of which a guided portion 76 disposed on head section 56 is guided.

Figure 6:
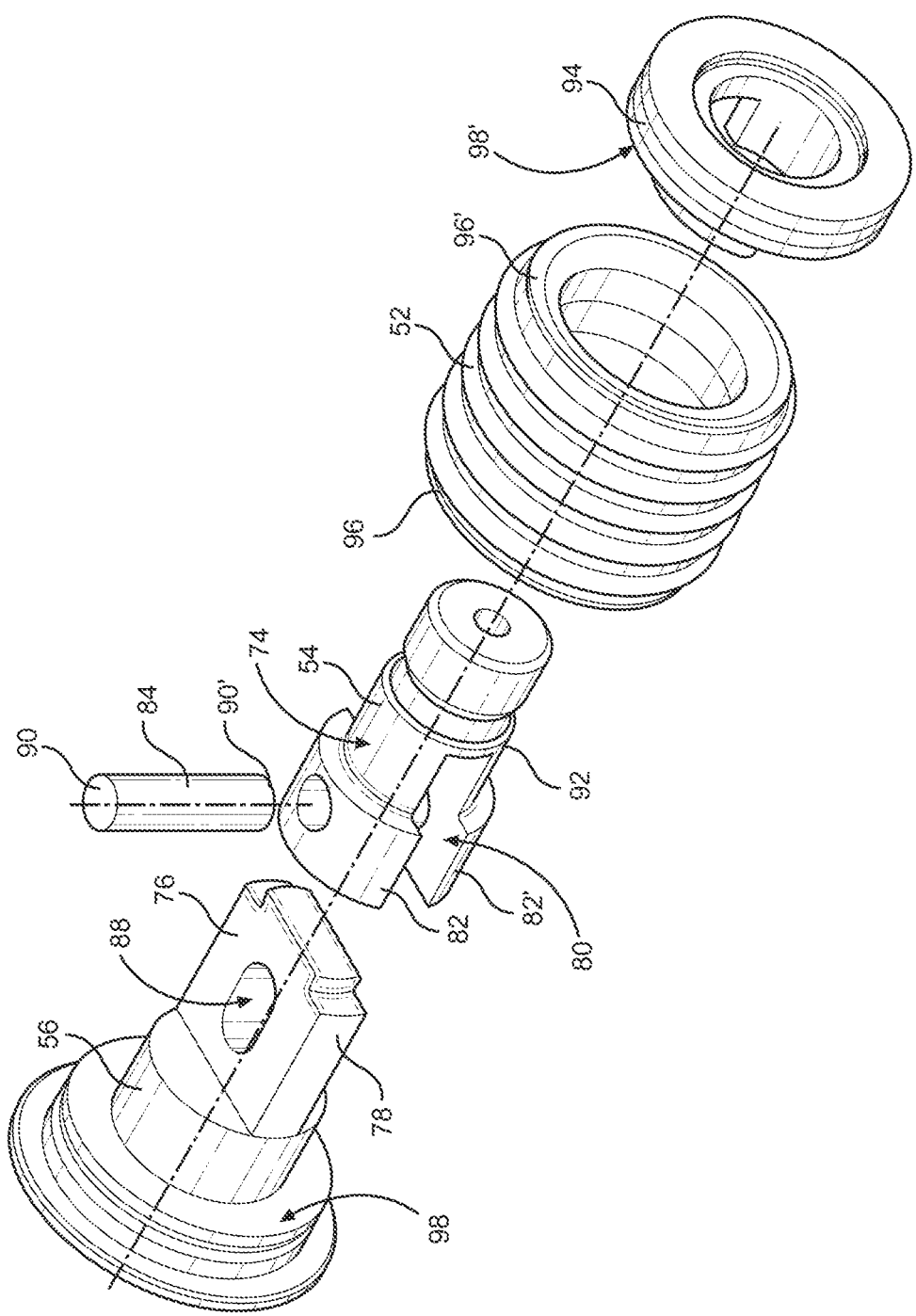
FIG. 6 shows a view of the bellows cylinder according to the invention, in the form of an exploded view.

FIG. 6 shows the bellows cylinder 18 according to the invention in an exploded view that illustrating its structure. In the embodiment shown, head section 56 is formed as an integral part and has, as guided portion 76, a guide bar 78 running across the middle, which is received displaceably in a guide groove 80 of guide member 74. To form guide groove 80, guide member 74 of foot section 54 has two legs 82, 82' which overlie the two sides of guide bar 78 on head section 56.

In one embodiment, the means 64 for limiting adjustment path includes a pin element 84 arranged stationarily on guide member 74 as a stop member for the movable head section 56. Pin element 84 matches an elongate hole 88 that forms a stop face 86 in guide bar 78 of movable head section 56. Pin element 84 projects all the way through elongate hole 88 in guide bar 78, with the two pin ends 90, 90' of pin element 84 being fixed to the legs 82, 82' of foot section 54. Foot section 54 is in multiple parts to ensure that bellows cylinder 18 can be assembled. Foot section 54 includes a journal body 92 and a securing ring 94 which can be connected to journal body 92. The bellows element embodied as gaiter 52 includes connecting ends 96, 96', which can be welded to flange sections 98, 98' of foot and head sections 54, 56.

Figure 7:
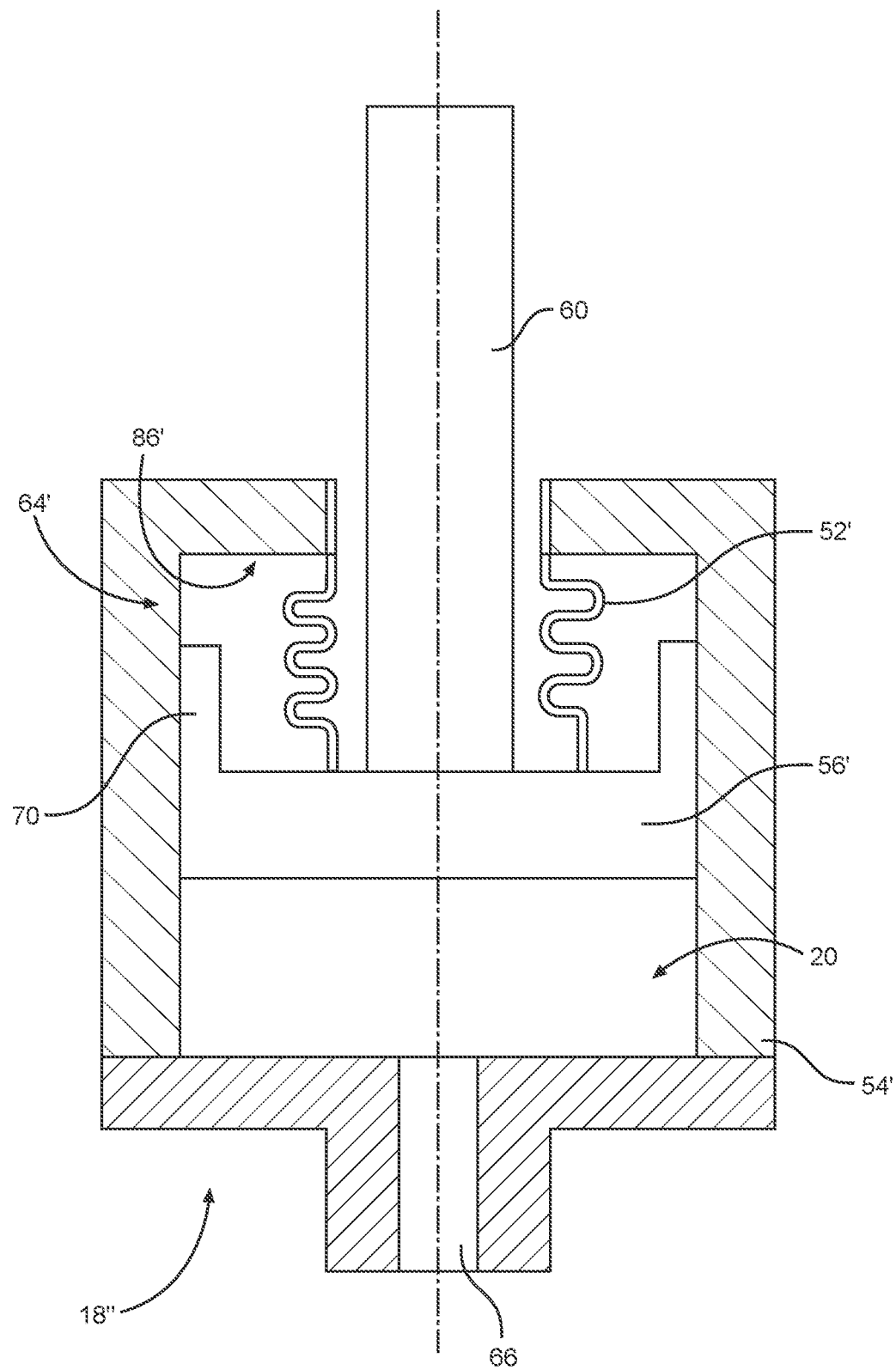
FIG. 7 shows a view of another embodiment of a bellows cylinder according to the invention.

FIG. 7 shows another embodiment of a bellows cylinder 18" according to the invention, which comprises a foot section 54' having an opening 66 for a fluid-channeling connection to a pressure source. The foot section 54' shown in FIG. 7 is also accommodated fixedly in cleaning unit 10. In the embodiment shown, foot section 54' is embodied similarly to a cylinder in which a movable head section 56' is guided like a piston. In this embodiment, a variable-volume pressure chamber 20 is defined primarily by the stationary foot section 54' and the head section 56' which is movable relative to foot section 54'.

The movable head section 56' is coupled to a tappet 60, which can be brought into contact with the actuation side of a scraper member 14 arranged on the cleaning unit 10 (FIG. 3). Bellows cylinder 18" also comprises a bellows element in the form of a gaiter 52', which serves as a sealing member between the stationary foot section 54' and the movable head section 56'. In the embodiment shown, when there is an increase in pressure inside pressure chamber 20, and a concomitant increase in its volume, gaiter 52' is compressed in the longitudinal direction.

In one embodiment, bellows cylinder 18" also includes a means 64' for limiting the adjustment path, said means 64' having a stop member in the form of a material projection 70 on the movable head section 56'. When the maximum adjustment path has been travelled, material projection 70 comes up against a stop face 86' on the stationary foot section 54'.

LIST OF REFERENCE SIGNS

| | |
|---|---|
| 1 | Filtering device |
| 2 | Housing |
| 4 | Filter chamber |
| 6 | Dirt outlet |
| 8 | Filter element |
| 8' | Dirt side |
| 8" | Clean side |
| 10 | Cleaning unit |
| 12 | Cleaning head |
| 14, 14' | Scraper member |
| 16 | Servomechanism |
| 18, 18', 18" | Bellows cylinder |
| 20 | Pressure chamber |
| 22 | Rotational axis |
| 26 | Outer surface |
| 28 | Shaft member |

-continued

| | |
|---|---|
| 30, 30' | Receptacle |
| 32 | Knife drum |
| 34, 34' | Conical portion |
| 36 | Flange |
| 38 | Cap member |
| 40 | Supply channel |
| 42, 42' | Distribution channel |
| 44 | Conveying screw |
| 46 | Discharge channel |
| 48 | Direction of flow |
| 50 | Screen |
| 52, 52' | Gaiter |
| 54, 54' | Foot section |
| 56, 56' | Head section |
| 58 | Guide flange |
| 60 | Tappet |
| 62 | Reinforcing web |
| 64, 64' | Means for limiting the adjustment path |
| 66 | Opening |
| 68 | Guide mechanism |
| 70 | Material projection |
| 72 | Connecting journal |
| 74 | Guide member |
| 76 | Guided portion |
| 78 | Guide bar |
| 80 | Guide groove |
| 82, 82' | Legs |
| 84 | Pin element |
| 86, 86' | Stop surface |
| 88 | Elongate hole |
| 90, 90' | Pin end |
| 92 | Journal body |
| 94 | Securing ring |
| 96, 96 | Connector end |
| 98, 98' | Flange section |

What is claimed is:

1. A filtering device for removing dirt particles and contaminants from a plastic melt, the filtering device comprising:
   a housing having a filter chamber configured to receive plastic melt therein, and a dirt outlet for discharging dirt particles from the housing;
   a filter element arranged in the filter chamber and through which a stream of plastic melt can be channelled, the filter element being configured to retain any dirt particles contained in the stream of plastic melt;
   a cleaning unit for cleaning the filter element of dirt particles retained by the filter element, said cleaning unit having a cleaning head with at least one scraper member for detaching dirt particles from the filter element, wherein said cleaning head and said filter element are movable relative to each other and can be brought into contact with each other at least temporarily; and
   a servomechanism coupled to the at least one scraper member and configured to press the at least one scraper member onto a surface of the filter element, the servomechanism having at least one bellows cylinder comprising:
      a foot section having at least one opening for a fluid-channelling connection to a pressure source,
      a head section configured to move along an adjustment path relative to the foot section,
      a deformable bellows element which is sealingly connected to the foot section and to the head section, and
      a pressure chamber of variable volume which is configured to move the head section relative to the foot section depending on the pressure prevailing in the pressure chamber,
   wherein the cleaning unit has a supply channel which is connectable to the pressure source.

2. The filtering device of claim 1, wherein the head section comprises a guide mechanism formed inside the pressure chamber and configured to guide the head section along the adjustment path.

3. The filtering device of claim 2, wherein the guide mechanism comprises a guide member disposed on the foot section and a guided portion disposed on the head section.

4. The filtering device of claim 3, wherein the guided portion has a guide bar running across the middle and extending in the direction opposite to the adjustment path, the guide member having a guide groove which receives the guide bar in sections on both sides.

5. The filtering device of claim 4, wherein the head section has a material recess on the guide bar and extending in the direction of the adjustment path.

6. The filtering device of claim 1, wherein the bellows element is a gaiter connected at one end to the foot section and at its other end to the head section.

7. The filtering device of claim 1, wherein the cleaning unit comprises a knife drum rotatable about a rotational axis and which has an outer surface which is substantially cylindrical at least in part and on which a plurality of scraper members are arranged.

8. The filtering device of claim 7, wherein the force transmission means is a tappet extending substantially radially through a section of the knife drum, wherein said tappet is accommodated in the knife drum.

9. The filtering device of claim 1, wherein the filter element has a cylindrical screen which is fixed inside the filter chamber and which is arranged approximately equidistant around an outer surface of the cleaning unit.

10. The filtering device of claim 9, wherein the screen has passages which widen in cross-section in the direction in which the plastic melt passes through them.

11. The filtering device of claim 1, wherein the supply channel extends parallel to an axis of rotation, from which supply channel a plurality of distribution channels for supplying pressure to the bellows cylinder extend substantially in the radial direction.

12. The filtering device of claim 1, wherein the at least one scraper member is coupled via a force transmission means to the head section of the respectively assigned at least one bellows cylinder.

13. The filtering device of claim 1, wherein the cleaning unit includes at least one inner shaft member with receptacles for the at least one bellows cylinder and an outer knife drum which forms an outer surface of the cleaning unit and which separates the at least one bellows cylinder fluid-sealingly from the plastic melt to be cleaned.

14. The filtering device of claim 13, wherein the movable head section of the at least one bellows cylinder is supported displaceably over its entire adjustment path in a receptacle of the receptacles for the at least one bellows cylinder on the inner shaft member.

15. The filtering device of claim 1, further comprising a conveying screw for discharging the dirt particles, the conveying screw being arranged in the region of the dirt outlet and coupled to the cleaning unit.

16. A cleaning unit for removing dirt particles and contaminants from a filter element of a filtering device, the cleaning unit comprising:
   a cleaning head with at least one scraper member for detaching dirt particles from the filter element, wherein said cleaning head and said filter element are movable relative to each other and can be brought into contact with each other at least temporarily;

a servomechanism coupled to the at least one scraper member, the servomechanism configured to press the scraper member onto a surface of the filter element, the servomechanism having at least one bellows cylinder comprising:
- a foot section having at least one opening for a fluid-channelling connection to a pressure source,
- a head section which can be moved along an adjustment path relative to the foot section,
- a deformable bellows element which is sealingly connected to the foot section and to the head section, and
- a pressure chamber of variable volume which is adapted to move the head section relative to the foot section depending on the pressure prevailing in the pressure chamber; and a supply channel which is connectable to the pressure source.

17. A filtering device for removing dirt particles and contaminants from a plastic melt, the filtering device comprising:

a housing having a filter chamber configured to receive plastic melt therein, and a dirt outlet for discharging dirt particles from the housing;

a filter element arranged in the filter chamber and through which a stream of plastic melt can be channelled, the filter element being configured to retain any dirt particles contained in the stream of plastic melt;

a cleaning unit for cleaning the filter element of dirt particles retained by the filter element, said cleaning unit having a cleaning head with at least one scraper member for detaching dirt particles from the filter element, wherein said cleaning head and said filter element are movable relative to each other and can be brought into contact with each other at least temporarily; and a servomechanism coupled to the at least one scraper member and configured to press the at least one scraper member onto a surface of the filter element, the servomechanism having at least one bellows cylinder comprising:
- a foot section having at least one opening for a fluid-channelling connection to a pressure source,
- a head section configured to move along an adjustment path relative to the foot section,
- a deformable bellows element which is sealingly connected to the foot section and to the head section, and
- a pressure chamber of variable volume which is configured to move the head section relative to the foot section depending on the pressure prevailing in the pressure chamber, wherein the cleaning unit includes at least one inner shaft member with receptacles for the at least one bellows cylinder and an outer knife drum which forms an outer surface of the cleaning unit and which separates the at least one bellows cylinder fluid-sealingly from the plastic melt to be cleaned.

18. The filtering device of claim 17, wherein the movable head section of the at least one bellows cylinder is supported displaceably over its entire adjustment path in a receptacle of the receptacles for the at least one bellows cylinder on the inner shaft member.

* * * * *